US012806901B2

United States Patent
(12) United States Patent
Nakano et al.
(10) Patent No.: US 12,806,901 B2
(45) Date of Patent: Nov. 24, 2026

(54) IMAGE FORMING DEVICE FORMING IMAGE ON MEDIUM BY EJECTING LIQUID DROPLET FROM HEAD

(71) Applicant: BROTHER KOGYO KABUSHIKI KAISHA, Nagoya (JP)

(72) Inventors: Yasuhiro Nakano, Nagoya (JP); Satoru Arakane, Nagoya (JP); Masashi Ohhashi, Kasugai (JP); Koichi Tsugimura, Nagoya (JP); Naoyuki Nakamura, Nagoya (JP); Haruka Azechi, Nagoya (JP); Taisei Nagata, Chita (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 108 days.

(21) Appl. No.: 18/983,964

(22) Filed: Dec. 17, 2024

(65) Prior Publication Data

US 2025/0206018 A1 Jun. 26, 2025

(30) Foreign Application Priority Data

Dec. 26, 2023 (JP) ................................ 2023-219583

(51) Int. Cl.
*B41J 2/045* (2006.01)
*B41J 11/00* (2006.01)

(52) U.S. Cl.
CPC ......... *B41J 2/04593* (2013.01); *B41J 2/0451* (2013.01); *B41J 11/0065* (2013.01); *B41J 2/04586* (2013.01)

(58) Field of Classification Search
CPC .. B41J 2/04593; B41J 2/0451; B41J 11/0065; B41J 2/04586; B41J 2/2128; B41J 19/207
See application file for complete search history.

(56) References Cited

FOREIGN PATENT DOCUMENTS

JP 2007038579 A * 2/2007

OTHER PUBLICATIONS

Yoshida Masahito, "Ejection Control at Performing Frame-Less Printing By Inkjet Printer" (JP 2007038579 A), Feb. 15, 2007, [Best-Mode, First and Second Embodiment] (Year: 2007).*

* cited by examiner

*Primary Examiner* — Lisa Solomon
(74) *Attorney, Agent, or Firm* — Scully, Scott, Murphy & Presser, P. C.

(57) ABSTRACT

A controller of an image forming device performs determining which to eject a small or large droplet. When a corresponding position is in a normal area: the controller performs the determining according to a normal criterion. When the corresponding position is in a suppression area: in response to determining that a prescribed condition is not met for both a used medium number and a usage period, the controller performs the determining according to a first suppression criterion; and in response to determining that the prescribed condition is met for at least one of the used medium number and the usage period, the controller performs the determining according to either a second suppression criterion or the normal criterion. The first and second suppression criteria suppressing use of the small droplet more than the normal criterion. The first suppression criterion suppressing use of the small droplet more than the second suppression criterion.

9 Claims, 13 Drawing Sheets

IMAGE FORMING DEVICE FORMING IMAGE ON MEDIUM BY EJECTING LIQUID DROPLET FROM HEAD

REFERENCE TO RELATED APPLICATIONS

This application claims priority from Japanese Patent Application No. 2023-219583 filed on Dec. 26, 2023. The entire content of the priority application is incorporated herein by reference.

BACKGROUND ART

Conventionally, there are image forming devices that eject droplets of liquid (liquid droplets) such as ink droplets both inside and outside a medium. The printer disclosed in Japanese Patent Application Publication No. 2007-38579 is one example of such an image forming device. This conventional printer performs borderless printing by ejecting ink droplets even outside the medium.

This type of image forming device may produce mist consisting of microdroplets that float inside the device. When such mist is generated repeatedly, parts within the device may become contaminated with liquid droplets, leading to harmful effects.

Mist is more likely to be generated when relatively small droplets are ejected outside the medium. Therefore, Japanese Patent Application Publication No. 2007-38579 describes a method of reducing the generation of mist by restricting the ejection of small droplets outside the medium. However, restricting the ejection of small droplets could reduce the quality of the image formed on the medium.

SUMMARY

The degree to which the harmful effects caused by mist occur varies depending on how the device has been used (the usage background of the device). In other words, even when certain degree of mist is generated, the harmful effects of such mist may be relatively small depending on how the device has been used. Therefore, when the ejection of small droplets is suppressed irrespective of how the device has been used, as described in Japanese Patent Application Publication No. 2007-38579, image quality will be unnecessarily degraded.

In view of the foregoing, it is an object of the present disclosure to provide an image forming device that appropriately restricts the ejection of small droplets while minimizing any degrading of image quality.

In order to attain the above and other objects, according to one aspect, the present disclosure provides an image forming device including: a head; and a controller. The controller is configured to perform: an image forming process. The image forming process includes forming an image represented by image data on a medium by controlling the head to perform a plurality of liquid droplets onto a plurality of positions within an ejection region of the medium. Each of the plurality of ejections includes ejecting a corresponding liquid droplet onto a corresponding position of the plurality of positions. The ejection region includes an inside area and an outside area of the medium. The forming in the image forming process includes: a droplet determination process; and an ejection process. The droplet determination process includes determining, for each of the plurality of ejections, which to eject a small droplet or a large droplet as the corresponding liquid droplet based on the image data. The small droplet is a liquid droplet having a small size. The large droplet is a liquid droplet having a large size larger than the small size. The ejection process includes ejecting, as each of the plurality of ejections, one of the small droplet and the large droplet corresponding to the corresponding liquid droplet determined in the droplet determination process onto the corresponding position. In the droplet determination process, the determining for each of the plurality of ejections performs: when the corresponding position is in a normal area including the inside area and excluding an edge portion in the inside area of the medium: a normal droplet determination process; and when the corresponding position is in a suppression area including the outside area and the edge portion of the inside are: in response to determining that a prescribed condition is not met for both a used medium number and a usage period, a suppression droplet determination process; and in response to determining that the prescribed condition is met for at least one of the used medium number and the usage period, a suppression relaxation droplet determination process. The normal droplet determination process includes determining the corresponding liquid droplet according to a normal criterion. The suppression droplet determination process includes determining the corresponding liquid droplet according to a first suppression criterion. The used medium number is a cumulative number of media used during the image forming process performed previously. The usage period is a time period for which the image forming device has been used. The first suppression criterion suppresses use of the small droplet more than the normal criterion. The suppression relaxation droplet determination process includes determining the corresponding liquid droplet according to either a second suppression criterion or the normal criterion. The second suppression criterion suppresses use of the small droplet more than the normal criterion. The first suppression criterion suppresses use of the small droplet more than the second suppression criterion. In the ejection process, the ejecting performs, in accordance with the determining in the droplet determination process, one of: a normal ejection process; a suppression ejection process; and a suppression relaxing process. The normal ejection process includes ejecting the corresponding liquid droplet determined in the normal droplet determination process. The suppression ejection process includes ejecting the corresponding liquid droplet determined in the suppression droplet determination process. The suppression relaxing process includes ejecting the corresponding liquid droplet determined in the suppression relaxation droplet determination process. Suppression degree for the suppression relaxing process is reduced compared to suppression degree for the suppression ejection process. The suppression degree for the suppression relaxing process is degree of suppression on use of the small droplet in the ejecting in the suppression relaxing process compared to used of the small droplet in the ejecting in the normal ejecting process. The suppression degree for the suppression ejection process is degree of suppression on use of the small droplet in the ejecting in the suppression ejection process compared to use of the small droplet in the ejecting in the normal ejection process.

The normal ejection process is performed for a normal area inside the edge portion of a medium. In certain cases, a suppression ejection process is performed for a suppression area that includes the outside area of the medium. The suppression ejection process suppresses the use of small droplets more than in the normal ejection process. Therefore, this process may degrade the quality of the image formed on the medium.

On the other hand, if at least one of the number of media used in the past and the usage period of the device satisfies a prescribed condition, a suppression relaxing process is performed. The suppression relaxing process includes at least one of the ejection process based on the determination result according to the second suppression criterion and the ejection process based on the determination result according to the normal criterion. The second suppression criterion suppresses the use of small droplets to a lesser extent than the first suppression criterion. The normal criterion does not suppress the use of small droplets. Therefore, when the suppression relaxing process is performed, the quality of the image formed on the medium is either not degraded or is degraded to a lesser extent than in the suppression ejection process.

The number of media used in the past and the usage period of the device are indicators of how far contamination in the device has progressed due to the generation of mist inside the device. When contamination in the device has progressed significantly, the suppression ejection process is necessary, but this process will degrade the quality of images formed on the media. On the other hand, when contamination in the device has not progressed significantly, performing the suppression relaxing process is appropriate to preserve image quality. Hence, by switching between the suppression ejection process and the suppression relaxing process based on the number of media used in the past and the usage period of the device, processes for suppressing the use of small droplets can be maintained while avoiding unnecessary degradation of image quality.

DESCRIPTION

Below, a printer 100 according to one embodiment of the present disclosure will be described while referring to the accompanying drawings. In the following description, the up-down direction is defined on the basis of the state of the printer 100 in which the printer 100 is installed and ready for use (the state in FIG. 1); the left-right direction is defined as a direction of the long dimension of a housing 100*a* in a plan view; and the front-rear direction is defined as a direction of the short dimension of the housing 100*a* in a plan view.

Figure 1:
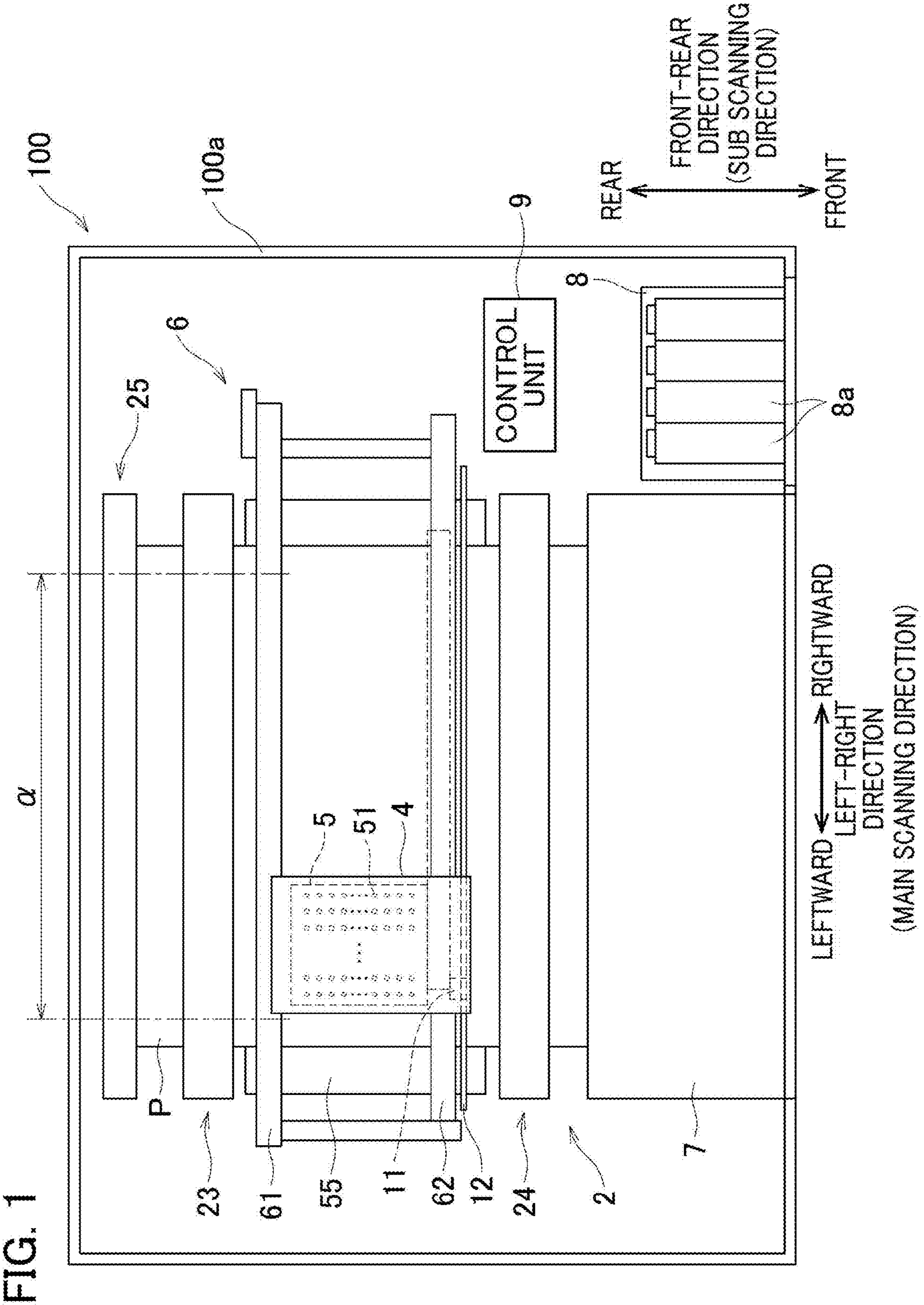
FIG. 1 is a schematic view of the configuration of a printer.

The printer 100 (corresponding to the "image forming device" of the present disclosure) is a device that forms images on sheets P of paper. As illustrated in FIG. 1, the printer 100 primarily includes the housing 100*a*, a conveying mechanism 2, a carriage 4, a head 5, a moving mechanism 6, a discharge tray 7, a cartridge mounting unit 8, and a control unit 9.

The conveying mechanism 2 (corresponding to the "supplying portion" of the present disclosure) supplies sheets P accommodated in the bottom of the housing 100*a* to the head 5 disposed thereabove. The conveying mechanism 2 includes a pair of conveying rollers 23, a pair of conveying rollers 24, and a guide unit 25. The guide unit 25 guides a sheet P being conveyed upward by a roller disposed in the lower section of the housing 100*a* toward the front.

The pairs of conveying rollers 23 and 24 are spaced apart from each other in the front-rear direction. The pair of conveying rollers 23 are configured of a drive roller that is driven to rotate by a conveying motor 23*a* (see FIG. 3) and a follow roller that rotates along with the drive roller. The pair of conveying rollers 24 are configured of a drive roller that is driven to rotate by a conveying motor 24*a* (see FIG. 3) and a follow roller that rotates along with the drive roller. A sheet P guided frontward by the guide unit 25 is conveyed farther frontward by the pairs of conveying rollers 23 and 24.

Figure 3:
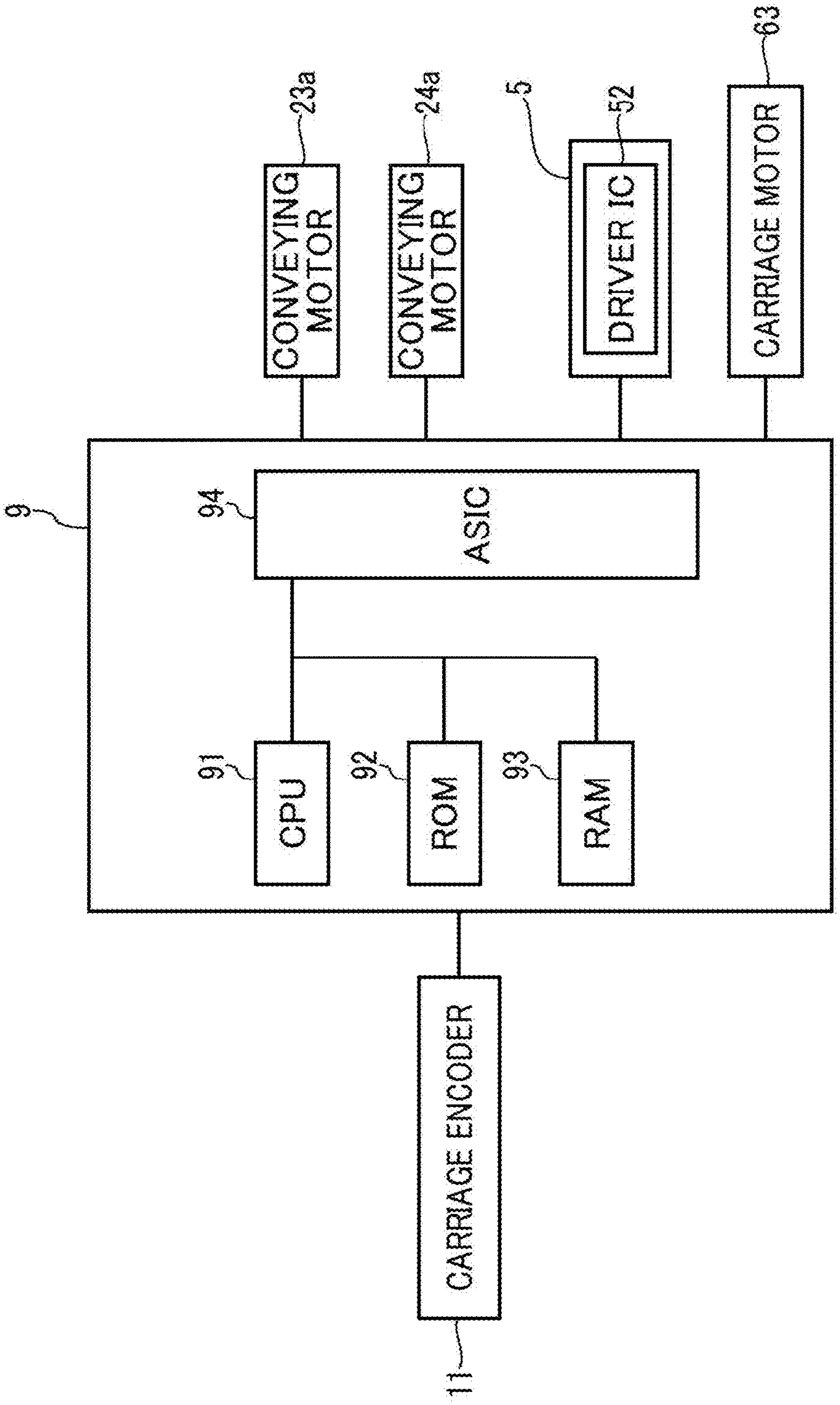
FIG. 3 is a block diagram of the configuration of a control system in the printer illustrated in FIG. 1.

The head 5 (corresponding to the "head" of the present disclosure) includes a plurality of nozzles 51 formed in the bottom surface of the head 5, and a driver IC 52 (see FIG. 3). When the driver IC 52 is driven under control of the control unit 9, ink is ejected from the nozzles 51. The ink lands in an area on the sheet P in the image-recording position opposing the bottom surface of the head 5. The head 5 deposits ink on the sheet P as the conveying mechanism 2 conveys the sheet P, forming an image on the sheet P.

The driver IC 52 can eject ink droplets from the nozzles 51 while changing the size of the ink droplets. In the present embodiment, the driver IC 52 selectively uses small, medium, and large ink droplets that differ in size. These droplets have the following size relationship: small ink droplet<medium ink droplet<large ink droplet. Note that the small ink droplet and the medium ink droplet each correspond to the "small droplet" of the present disclosure. In addition, the large ink droplet corresponds to the "large droplet" of the present disclosure.

The head 5 is mounted in the carriage 4. The moving mechanism 6 can move the carriage 4. The moving mechanism 6 includes two guide rails 61 and 62, and a carriage motor 63 (see FIG. 3). The two guide rails 61 and 62 are spaced apart from each other in the front-rear direction, with each extending in the left-right direction. The carriage 4 is arranged so as to span across the two guide rails 61 and 62. The carriage 4 is connected to the carriage motor 63 via a belt and the like. When the carriage motor 63 is driven under control of the control unit 9, the carriage 4 moves in the left-right direction along the guide rails 61 and 62. In the following description, the direction in which the carriage 4 moves (i.e., the left-right direction) will be called the main scanning direction, while the direction in which sheets P are conveyed (i.e., the front-rear direction) will be called the sub scanning direction.

A carriage encoder 11 is provided on the carriage 4. When used together with a scale 12, the carriage encoder 11 (corresponding to the "second detector" of the present disclosure) can detect the position of the carriage 4 in the main scanning direction. The scale 12 extends in the left-right direction at a position slightly frontward of the guide rail 62. The scale 12 includes light-transmitting portions that transmit light and light-blocking portions that block light formed alternately in the left-right direction. The carriage encoder 11 includes a light-emitting element and a light-receiving element arranged on opposite sides of the scale 12. When light emitted from the light-emitting element is received by the light-receiving element, the carriage encoder 11 detects a state in which the light has passed through a light-transmitting portion of the scale 12. When the light emitted from the light-emitting element is not received by the light-receiving element, on the other hand, the carriage encoder 11 detects a state in which the light has been blocked by a light-blocking portion of the scale 12. When the carriage 4 moves either to the left or right, the carriage encoder 11 alternately and repeatedly detects the former state and the latter state. Therefore, by counting the number of times the states change based on the detection results of the carriage encoder 11, the position of the carriage 4 can be detected. The carriage encoder 11 outputs the detection results to the control unit 9.

Figure 2:
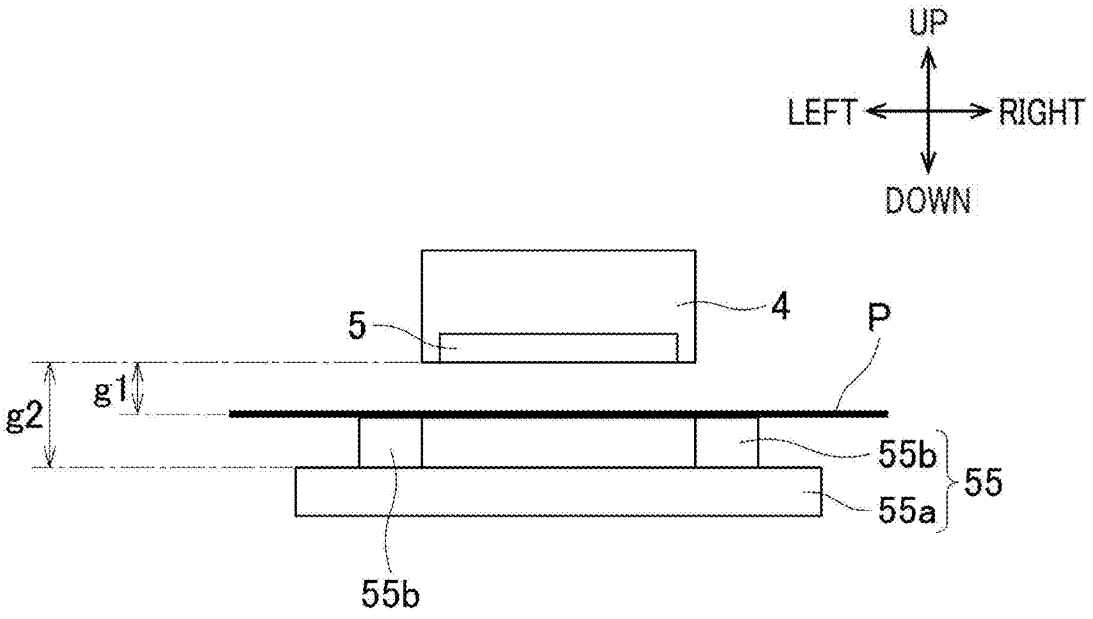
FIG. 2 is a front view of the configuration around a head of the printer illustrated in FIG. 1.

A platen 55 is arranged below the head 5 (see FIGS. 1 and 2). The platen 55 includes a body 55*a* having a rectangular parallelepiped shape, and a plurality of ribs 55*b* protruding upward from the top surface of the body 55*a*. The ribs 55*b* support the sheet P by contacting the sheet P with their top surfaces. The ribs 55*b* are formed within an area α shown in FIG. 1. The area α corresponds to the inside of the sheet P with respect to the left-right direction.

After the head 5 has formed an image on a sheet P, the conveying mechanism 2 discharges the sheet P into the discharge tray 7. The discharge tray 7 is disposed in front of the head 5 inside the housing 100*a* and in the upper section of the housing 100*a*.

The cartridge mounting unit 8 is disposed in the right end and front section of the housing 100*a*. Four ink cartridges 8*a* are removably mountable in the cartridge mounting unit 8. The ink cartridges 8*a* store therein ink in one of the colors black, yellow, cyan, and magenta. The ink cartridges 8*a* mounted in the cartridge mounting unit 8 supply ink to the head 5 through tubes (not illustrated) and the like.

The control unit 9 performs overall control of the printer 100. As illustrated in FIG. 3, the control unit 9 is electrically connected to the conveying motors 23*a* and 24*a*, the driver IC 52, the carriage motor 63, the carriage encoder 11, and the like.

As illustrated in FIG. 3, the control unit 9 includes a central processing unit (CPU) 91, a read-only memory (ROM) 92, a random-access memory (RAM) 93, an application-specific integrated circuit (ASIC) 94, and the like. The ROM 92 stores therein programs executed by the CPU 91 and ASIC 94, various fixed data, and the like. The ROM 92 also includes a writable area configured of an electrically erasable programmable read-only memory (EEPROM) or the like. History information indicating how the printer 100 has been used (the usage background of the printer 100) is written to this area (described later in detail). The RAM 93 temporarily stores therein image data representing images to be formed on sheets P, and data required when the CPU 91 executes programs. The image data is acquired from an external device, such as a PC, a Universal Serial Bus (USB) memory, or the like. The ASIC 94 performs processes such as overwriting data in the RAM 93. The control unit 9 also has a hardware clock that retains the current time.

The control unit 9 may be configured such that only the CPU 91 performs the various processes, only the ASIC 94 performs the various processes, or the CPU 91 and ASIC 94 cooperate to perform the various processes. Moreover, the control unit 9 may be configured such that a single CPU 91 performs the processing alone or a plurality of CPUs 91 share the processing tasks. Similarly, the control unit 9 may be configured such that a single ASIC 94 performs the processing alone or a plurality of ASICs 94 share the processing tasks. Next, various processes performed by the control unit 9 will be described.

Processes performed by the control unit 9 in the present embodiment include image forming processes, a history information recording process, and a prescanning process. Of these, the image forming processes are performed to form images on sheets P by controlling the operations of the conveying mechanism 2 and head 5 based on image data. In the image forming processes, the control unit 9 controls driving of the conveying motors 23*a* and 24*a* and the carriage motor 63 based on the position of the carriage 4 indicated by detection results from the carriage encoder 11. Through this control, the control unit 9 feeds sheets P to the head 5 and ejects ink from the head 5 at appropriate positions and timings.

Figure 4:
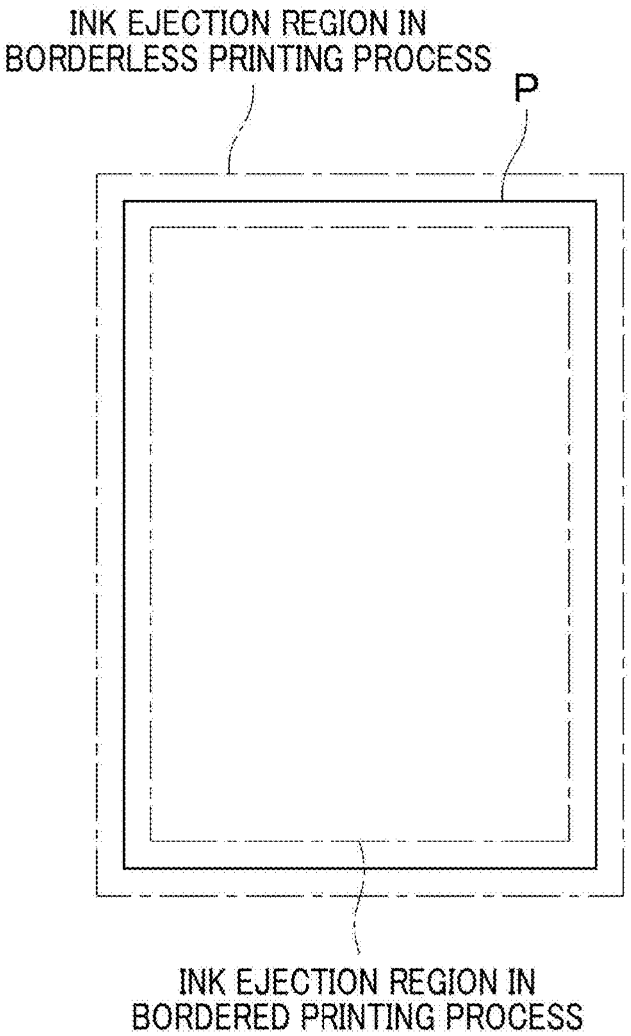
FIG. 4 is an explanatory diagram illustrating ink ejection regions in bordered printing and borderless printing processes performed by the printer illustrated in FIG. 1.

Image forming processes according to the present embodiment include bordered printing and borderless printing processes. As illustrated in FIG. 4, in bordered printing processes, the control unit 9 ejects ink from the head 5 toward only an area inside the sheet P. In borderless printing processes, the control unit 9 ejects ink from the head 5 toward both the inside and outside of the sheet P so as to cross the outer edges of the sheet P.

Figure 5:
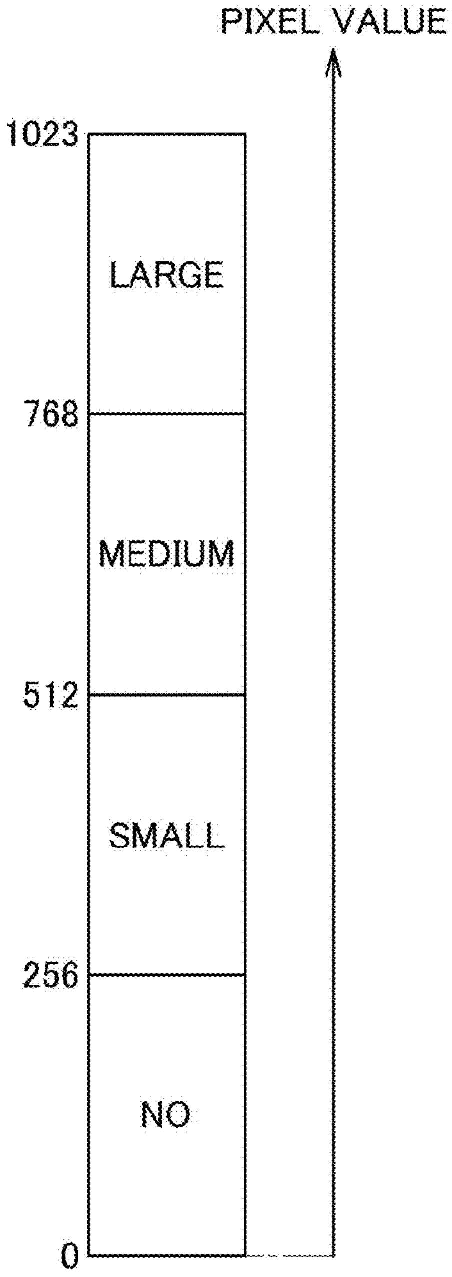
FIG. 5 is a graph of threshold values used for determining the sizes of ink droplets ejected from the head of the printer illustrated in FIG. 1.

In the image forming process, the control unit 9 selects the sizes of ink droplets to be ejected from the head 5 based on the image data. The image data includes data specifying the pixel value of each pixel forming the image. FIG. 5 is a graph of threshold values used for determining the sizes of ink droplets in bordered printing. The graph in FIG. 5 represents the relationships between threshold values and the sizes of ink droplets when pixels have a range of values between 0 and 1023. In FIG. 5, 256 is the threshold value dividing the non-ejection of ink and the small ink droplet (hereinafter called the “no/small threshold”), 512 is the threshold value dividing the small ink droplet and the medium ink droplet (hereinafter called the “small/medium threshold”), and 768 is the threshold value dividing the medium ink droplet and the large ink droplet (hereinafter called the “medium/large threshold”). Specifically, if the pixel value of a certain pixel is less than or equal to 256, ink is not ejected for that pixel. If a certain pixel value is greater than 256 and less than or equal to 512, a small ink droplet is used for that pixel. If a certain pixel value is greater than 512 and less than or equal to 768, a medium ink droplet is used for that pixel. If a certain pixel value is greater than 768, a large ink droplet is used for that pixel.

Furthermore, in determining the size of an ink droplet, the control unit 9 performs an error diffusion process for processing an error between the density of a pixel actually formed on the sheet P by an ejected ink droplet and the density specified by the original pixel value. Specifically, when determining the size of an ink droplet for a certain pixel, the control unit 9 carries the error between the pixel value and an error reference value corresponding to the size of that ink droplet over to the pixel value of a neighboring pixel, as described below.

Figure 6:
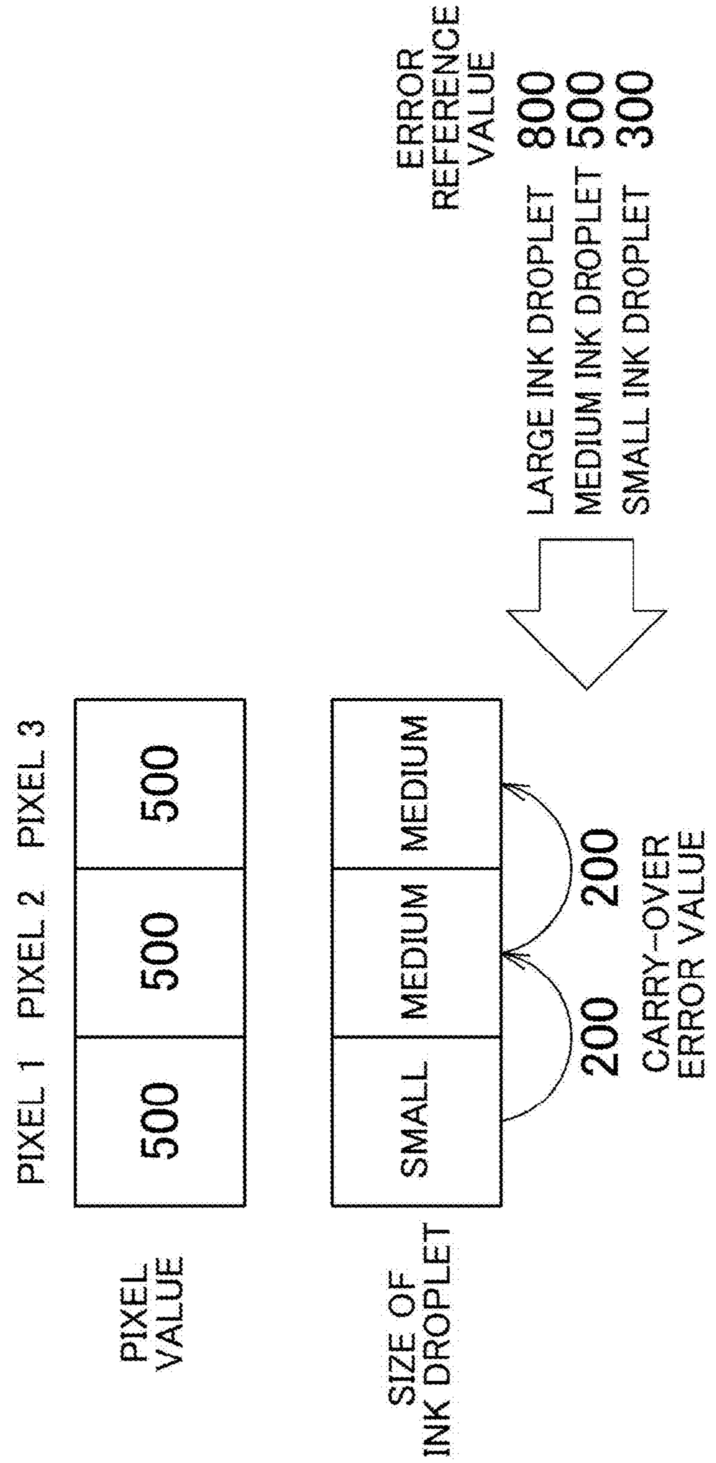
FIG. 6 is an explanatory diagram illustrating one example of an error diffusion process performed for determining the sizes of ink droplets.

FIG. 6 illustrates one example of an error diffusion process when using the threshold values shown in FIG. 5 and when the error reference values for large, medium, and small ink droplets are set to 800, 500, and 300, respectively. As illustrated in FIG. 6, when each of the neighboring pixels 1 through 3 has the pixel value of 500, the control unit 9 sets the ink droplet for pixel 1 to a small ink droplet based on the threshold values in FIG. 5. Since the error reference value for small ink droplets is 300 while the pixel value for pixel 1 is 500 in this case, the control unit 9 carries the difference 500−300=200 over to the neighboring pixel 2. Therefore, the control unit 9 determines the size of the ink droplet for pixel 2 based on the value 700 obtained by adding the carry-over error value of 200 to the original pixel value of 500. Accordingly, the size of the ink droplet for the pixel value of 700 is set to a medium ink droplet based on the threshold values in FIG. 5. Since the error reference value for medium ink droplets is 500 while the pixel value for pixel 2 is 700 in this case, the control unit 9 carries this difference 700−500=200 over to the neighboring pixel 3. The control unit 9 similarly sets the ink droplet for pixel 3 to a medium ink droplet according to FIG. 5 using the pixel value of 700, which is based on the original pixel value and the carry-over error value. The following description assumes that the error diffusion process is also performed when the sizes of ink droplets are determined.

The history information recording process is performed to write history information to the ROM 92. History information includes information specifying the total number of used sheets P, and information specifying the total usage time of the printer 100. The total number of used sheets is counted for each of the bordered printing and borderless printing processes performed in past image forming processes. Each time an image forming process is executed, the control unit 9 updates the history information by adding the number of sheets P used in that process to the total number of used sheets P in the respective bordered printing or borderless printing processes. Further, when the power to the printer 100 is first turned on, the control unit 9 references the hardware clock to acquire the current time as the usage starting date and time for using the printer 100. The control unit 9 then records this usage starting date and time in the ROM 92 as history information for determining the total usage time. Thereafter, the total usage time of the printer 100 can be obtained as the time elapsed between the usage starting date and time specified in the history information and the current time.

The prescanning process is performed to check whether the detection results of the carriage encoder 11 accurately indicate the position of the carriage 4. Prior to performing an image forming process, the control unit 9 performs the prescanning process by controlling the carriage motor 63 to move the carriage 4 along a prescribed moving path. If the detection results from the carriage encoder 11 indicate that the carriage 4 has reached a predetermined position at the completion of the prescanning process, the control unit 9 determines that the detection results are accurate. On the other hand, if the position of the carriage 4 at the completion of the prescanning process differs from the above predetermined position, the control unit 9 determines that the detection results from the carriage encoder 11 are inaccurate.

One reason that the carriage encoder 11 may provide such inaccurate detection results is due to mist that has spread and floats inside the housing 100*a* of the printer 100. Mist is a phenomenon in which ink ejected from the head 5 disperses during flight to form microdroplets of ink that remain airborne in the housing 100*a*. If mist is repeatedly generated, the carriage encoder 11 or scale 12 may become contaminated with ink, increasing the risk of these components losing their ability to produce accurate detections. In other words, an inaccurate detection result by the carriage encoder 11 in the prescanning process corresponds to significant mist contamination of the carriage encoder 11 and scale 12. The function of the control unit 9 to discern whether the detection results from the carriage encoder 11 are accurate in the prescanning process corresponds to the function of the “first detector” of the present disclosure since this function can detect the severity of mist contamination on the carriage encoder 11 and the like.

The primary cause of mist generation is found in the borderless printing processes described above. In borderless printing processes, ink droplets ejected inside the sheet P travel across a gap g1 illustrated in FIG. 2 to reach the sheet P. Ink droplets ejected outside the sheet P, on the other hand, travel across a gap g2 illustrated in FIG. 2 to reach the top surface of the body 55*a* of the platen 55. In other words, ink droplets ejected outside the sheet P travel a longer distance than ink droplets ejected inside the sheet P. As a result, the latter ink droplets are more likely to disperse in flight to become mist than the former ink droplets. That is, ink droplets ejected outside the sheet P are more likely to produce mist. Mist is also more likely to be generated when using small and medium ink droplets than when using large ink droplets.

Figure 7:
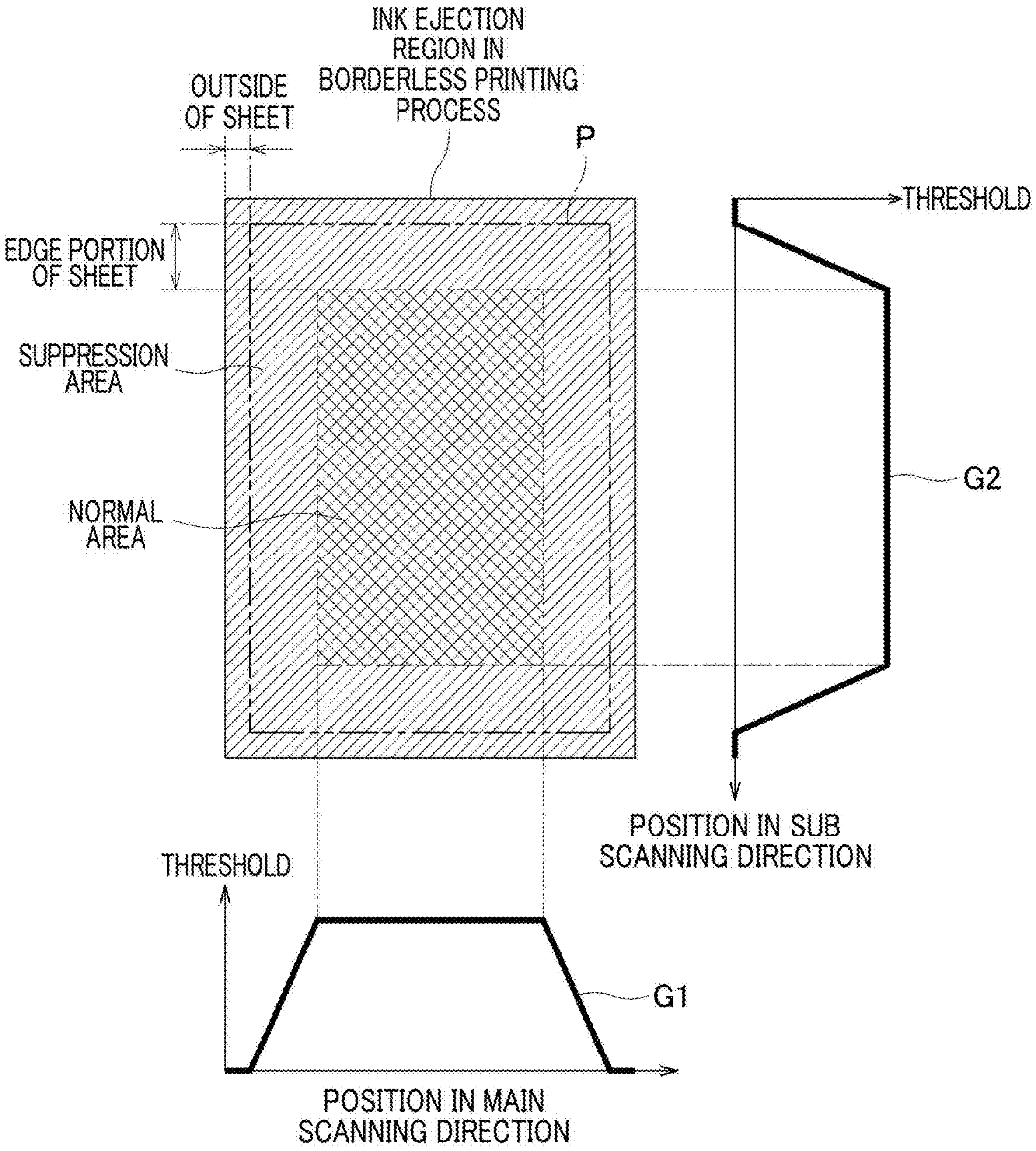
FIG. 7 is an explanatory diagram illustrating an ink ejection range relative to a sheet, along with graphs showing the relationship between threshold values used for determining the sizes of ink droplets and pixel positions.

Therefore, the ink ejection region in borderless printing processes is divided into a suppression area and a normal area. As illustrated in FIG. 7, the suppression area comprises edge portions of the sheet P and the outside of the sheet P. The normal area is an area inside the sheet P excluding the edge portions of the sheet P. In the normal area, the same threshold values for bordered printing are used to determine the sizes of ink droplets (corresponding to the "normal droplet determination process" of the present disclosure). That is, for example, the threshold values shown in FIG. 5 are used for the normal area. Ink droplets of the sizes determined on the basis of these threshold values are ejected from the head 5 into the normal area of the sheet P (corresponding to the "normal ejection process" of the present disclosure). In the suppression area, on the other hand, the use of medium and small ink droplets is suppressed more than in the normal area in specific cases (described below) when determining the sizes of ink droplets (corresponding to the "suppression droplet determination process" and "suppression relaxation droplet determination process" of the present disclosure). Ink droplets of sizes determined in this way are then ejected from the head 5 into the suppression area of the sheet P (corresponding to the "suppression ejection process" and "suppression relaxing process" of the present disclosure).

As a specific example, the threshold values depicted in graphs G1 and G2 of FIG. 7 are used for determining the sizes of ink droplets in borderless printing processes. Graph G1 represents the threshold values used for pixels with respect to their positions in the main scanning direction. Graph G2 represents the threshold values used for pixels with respect to their positions in the sub scanning direction. Both graphs use a fixed threshold value for pixels inside the normal area. In the suppression area, the threshold value decreases linearly as the pixel position moves farther away from the normal area and is zero in the area outside the sheet P. Thus, the relationship between the threshold value and the pixel position in the main scanning direction and the relationship between the threshold value and the pixel position in the sub scanning direction have a mutual correspondence. For this reason, the following description will focus on the relationship between the threshold value and the pixel position in the main scanning direction, and a description of the relationship between the threshold value and the pixel position in the sub scanning direction is omitted.

Figure 8A:
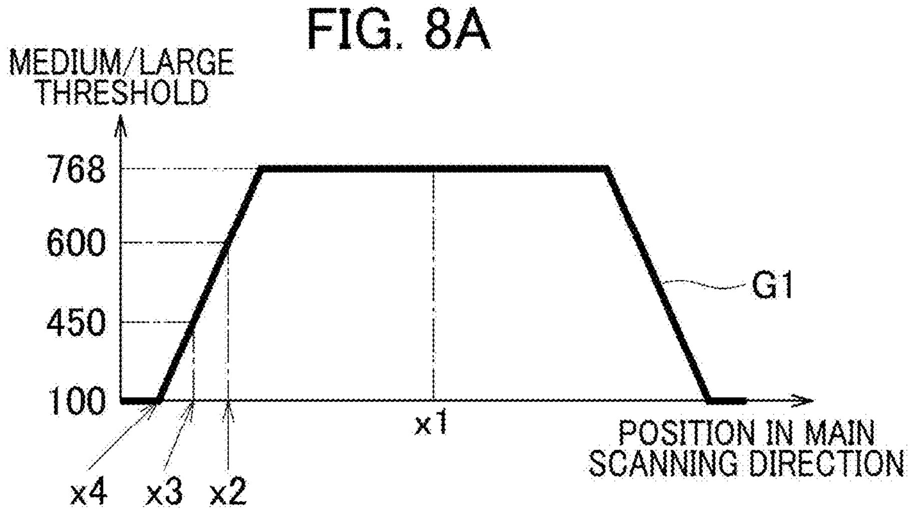
FIG. 8A is a graph showing an example of the relationship between medium/large threshold values for reliably suppressing the use of medium ink droplets and small ink droplets in a suppression area and pixel positions in a main scanning direction.
Figure 8B:
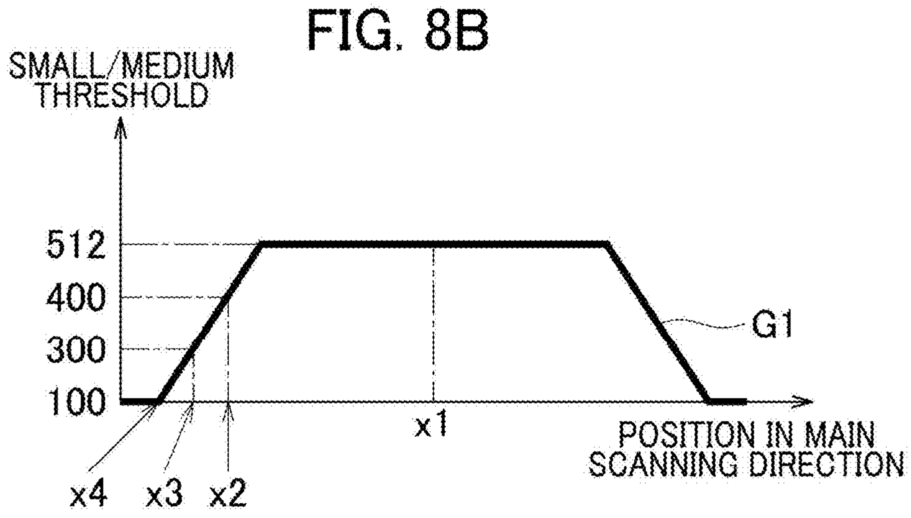
FIG. 8B is a graph showing an example of the relationship between small/medium threshold values for reliably suppressing the use of medium ink droplets and small ink droplets in the suppression area and pixel positions in the main scanning direction.
Figure 8C:
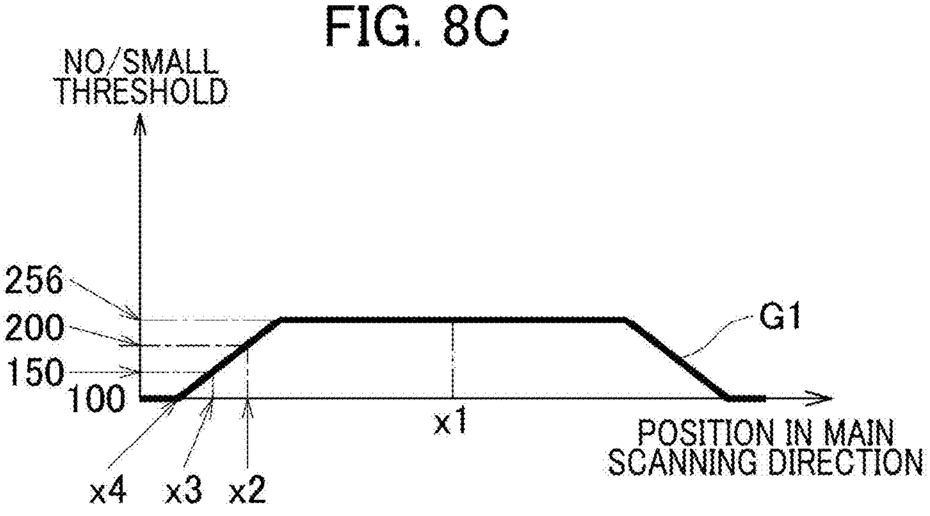
FIG. 8C is a graph showing an example of the relationship between no/small threshold values for reliably suppressing the use of medium ink droplets and small ink droplets in the suppression area and pixel positions in the main scanning direction.

Graph G1 is applied to each of the no/small threshold, small/medium threshold, and medium/large threshold. For example, the graph in FIG. 8A is applied to the medium/large threshold, the graph in FIG. 8B to the small/medium threshold, and the graph in FIG. 8C to the no/small threshold. In the graph of FIG. 8A, the threshold value is 768 for a position x1 in the normal area. Threshold values for positions x2, x3, and x4 in the suppression area are 600, 450, and 100, respectively. Note that positions x2, x3, and x4 are progressively farther from the normal area. In FIG. 8B, the threshold value is 512 for position x1 in the normal area. Threshold values for positions x2, x3, and x4 in the suppression area are 400, 300, and 100, respectively. In FIG. 8C, the threshold value is 256 for position x1 in the normal area. Threshold values for positions x2, x3, and x4 in the suppression area are 200, 150, and 100, respectively.

Figure 9:
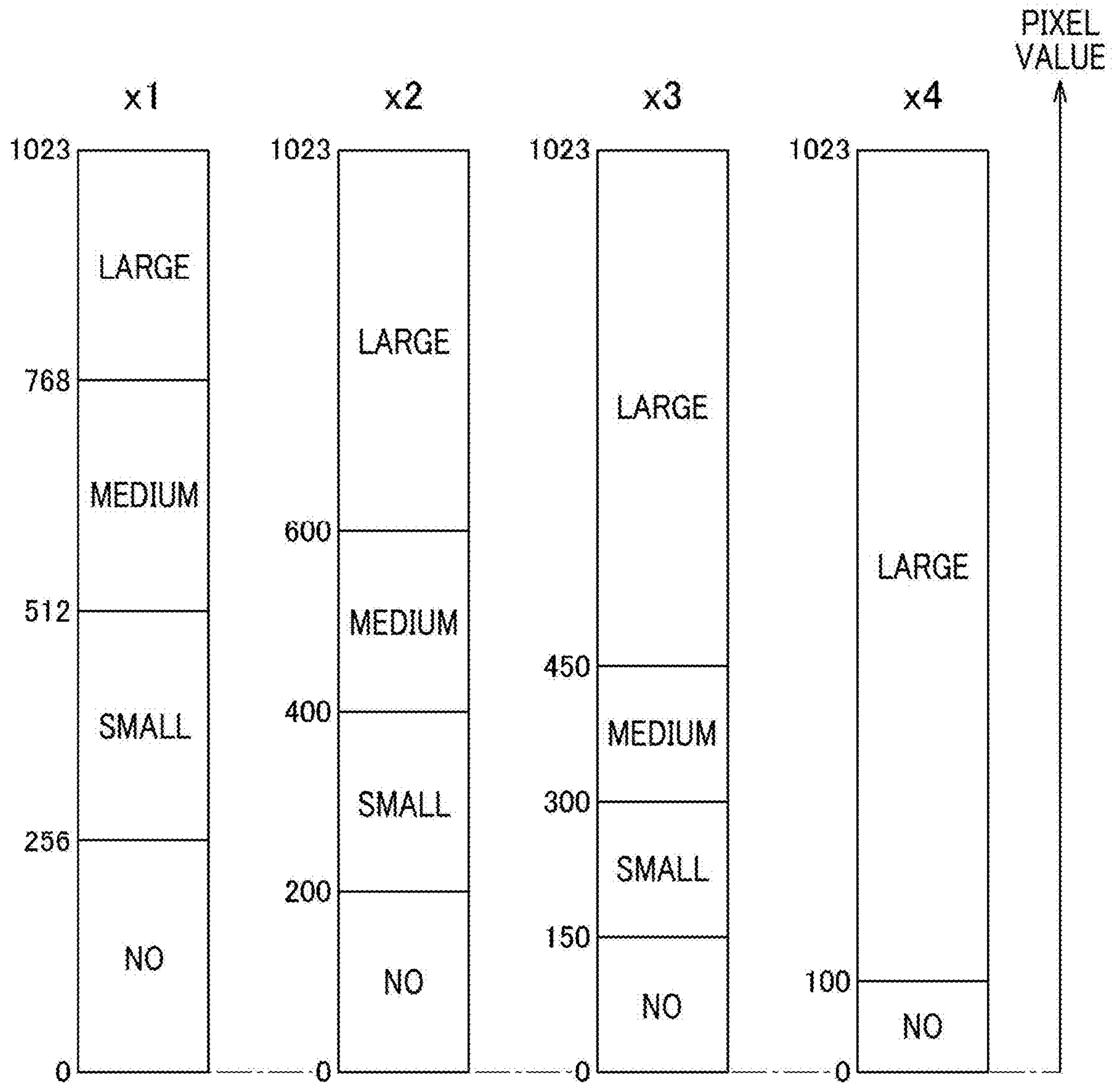
FIG. 9 illustrates graphs showing the relationships between the threshold values in FIGS. 8A through 8C and the sizes of ink droplets for each of positions x1, x2, x3, and x4.

FIG. 9 illustrates graphs of relationships between the threshold values in FIGS. 8A through 8C and the sizes of ink droplets for each of the positions x1, x2, x3, and x4. As illustrated in FIG. 9, the graphs for positions x2, x3, and x4 suppress the use of medium and small ink droplets more than the graph for position x1. Furthermore, the degree of suppression increases the farther the position is away from x1. In this way, the use of medium and small ink droplets, which tend to generate mist, is suppressed in borderless printing, thereby suppressing the generation of mist from ink ejected outside of the sheet P. The minimum value of 100 for each of the no/small threshold, small/medium threshold, and medium/large threshold in FIGS. 8A through 8C corresponds to the threshold value of 100 used for dividing the non-ejection of ink from large ink droplets in the graph of FIG. 9 for position x4, since neither medium ink droplets nor small ink droplets are used.

The degree to which the harmful effects caused by mist occur varies depending on how the printer 100 has been used. For example, if very few years have passed since the printer 100 was first used or if the total number of sheets P used in image formation on the printer 100 is few, even though mist may have been generated during use of the printer 100, contamination from such mist may not have accumulated in the housing 100*a* enough to have had a harmful effect. In other words, depending on how the printer 100 has been used, even if some mist has been generated, it is relatively unlikely that this mist has had harmful effects on the printer 100.

At the same time, when the use of medium and small ink droplets is suppressed in the suppression area during borderless printing processes, the quality of images formed on sheets P may be degraded as a result. If the use of medium and small ink droplets is similarly suppressed in the suppression area irrespective of how the printer 100 has been used, the image quality may be unnecessarily degraded, even though the risk of harmful effects from mist is low.

Therefore, the control unit 9 in the present embodiment executes a suppression relaxing process to relax suppressions on the use of medium and small ink droplets in the suppression area when a prescribed condition is met regarding the usage background of the printer 100. The prescribed condition is that the degree to which contamination in the housing 100*a* has progressed due to the generation of mist is low. The suppression relaxing process involves at least one of the following processes: reducing the degree of suppression on the use of medium and small ink droplets in the suppression area; and halting all suppression on the use of medium and small ink droplets.

Figure 10A:
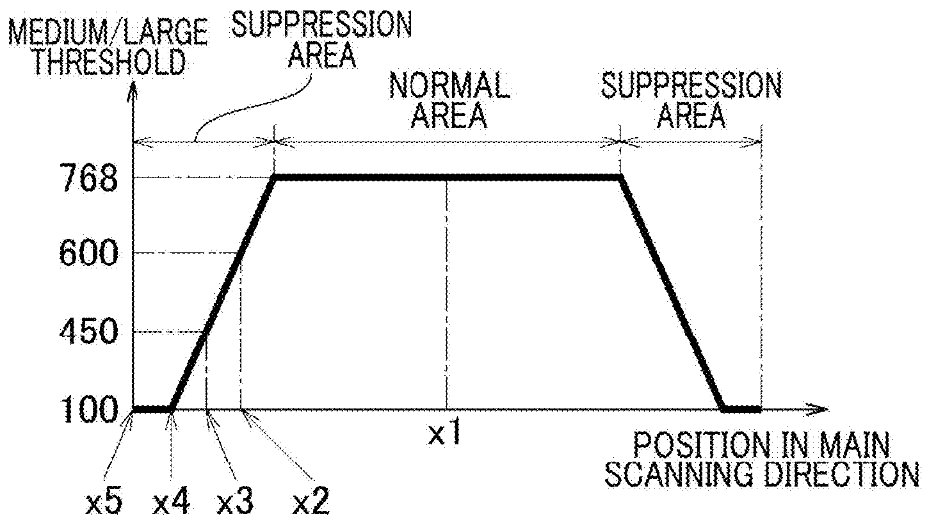
FIG. 10A is a graph showing an example of threshold values used for the medium/large threshold values when a prescribed condition is not met.
Figure 10B:
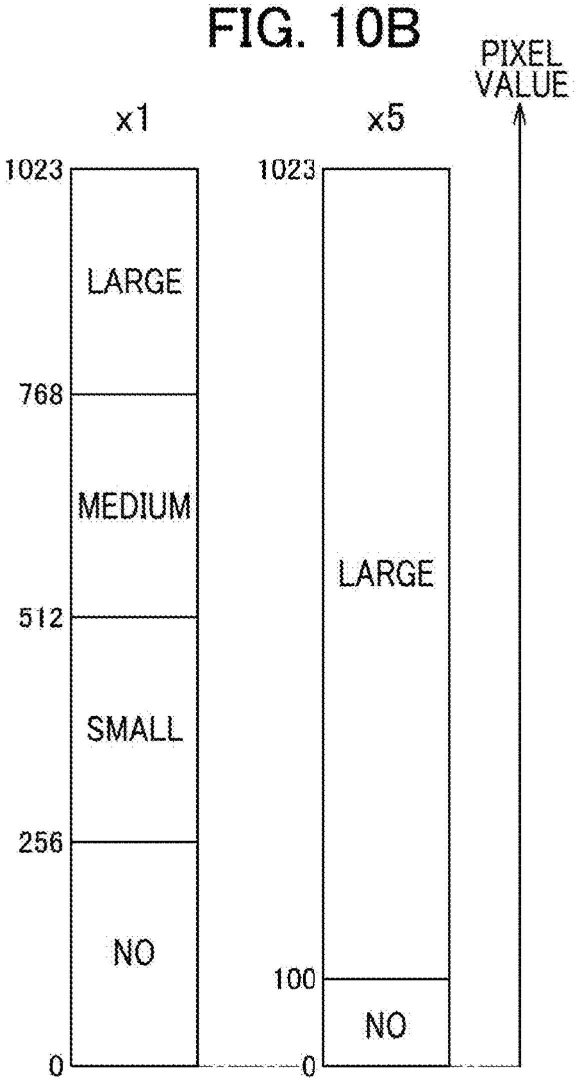
FIG. 10B is graphs showing the relationships between threshold values for determining the sizes of ink droplets and the sizes of ink droplets for each of positions x1 and x5 in the example illustrated in FIG. 10A.

As an example, FIG. 10A shows threshold values used for the medium/large threshold when the above prescribed condition is not met. These threshold values are the same as those shown in FIG. 8A. Thus, the threshold values in FIG. 10A are used when the risk of harmful effects being caused by mist is relatively high or when there is a relatively high probability that such risk will rapidly increase. The small/medium threshold of FIG. 8B and the no/small threshold of FIG. 8C are similarly used when the prescribed condition is not met. FIG. 10B is graphs showing the relationships between the pixel value thresholds and the ink droplet sizes used when setting the sizes of ink droplets for positions x1 and x5 in this case. Here, x5 denotes the outermost position of the suppression area. The size of each ink droplet is determined using the threshold values in FIG. 8A (10A), 8B, and 8C (corresponding to the "suppression droplet determination process" of the present disclosure), and ink droplets of the determined sizes are ejected from the head 5 into the suppression area (corresponding to the "suppression ejection process" of the present disclosure). Through this process, the use of medium and small ink droplets is reliably suppressed in the suppression area.

When the prescribed condition is met, on the other hand, the control unit 9 processes the entire suppression area using relaxation thresholds A or B. Both relaxation thresholds A and B include a no/small threshold, a small/medium threshold, and a medium/large threshold that are set so that the use of medium and small ink droplets is suppressed to lesser degree than when using the threshold values in FIGS. 8A through 8C. Furthermore, the relaxation thresholds B are set so that the use of medium and small ink droplets is suppressed to lesser degree than with the relaxation thresholds A.

Figure 11A:
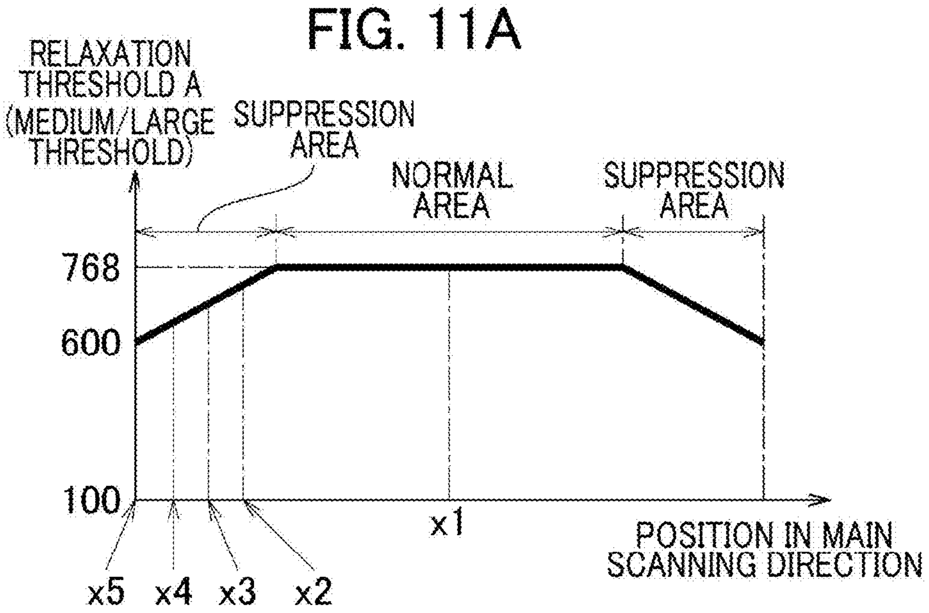
FIG. 11A is a graph showing an example of relaxation threshold values used for the medium/large threshold values when the prescribed condition is met.
Figure 11B:
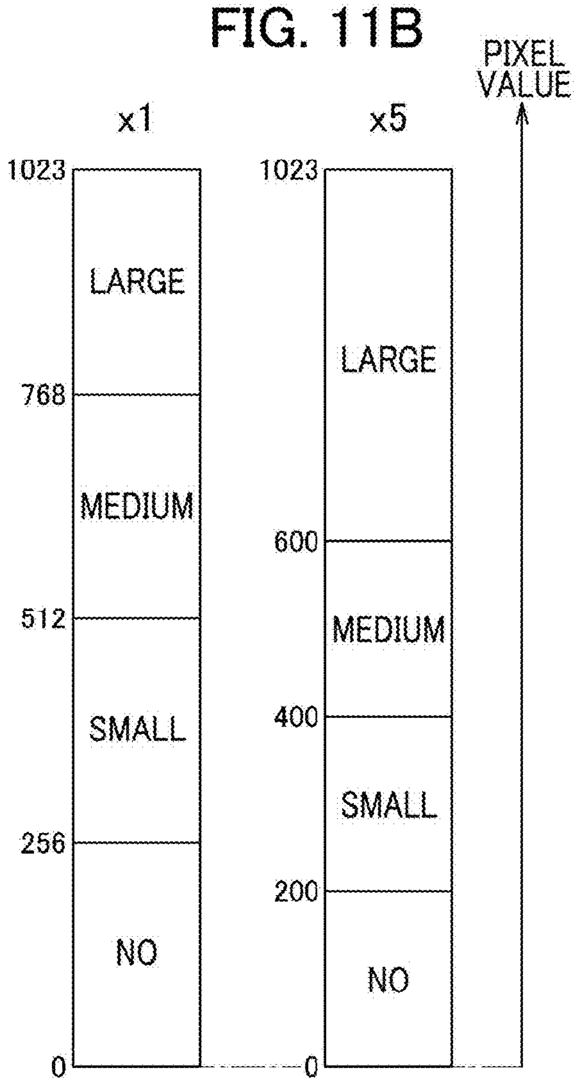
FIG. 11B is graphs showing the relationships between threshold values for determining the sizes of ink droplets and the sizes of ink droplets for each of positions x1 and x5 in the example illustrated in FIG. 11A.
Figure 12A:
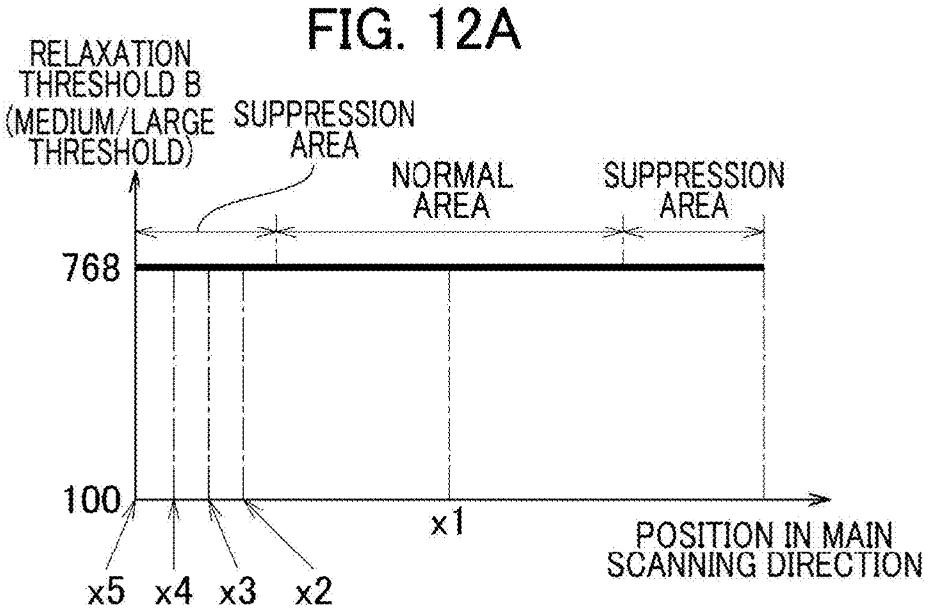
FIG. 12A is a graph showing another example of relaxation threshold values used for the medium/large threshold values when the prescribed condition is met.
Figure 12B:
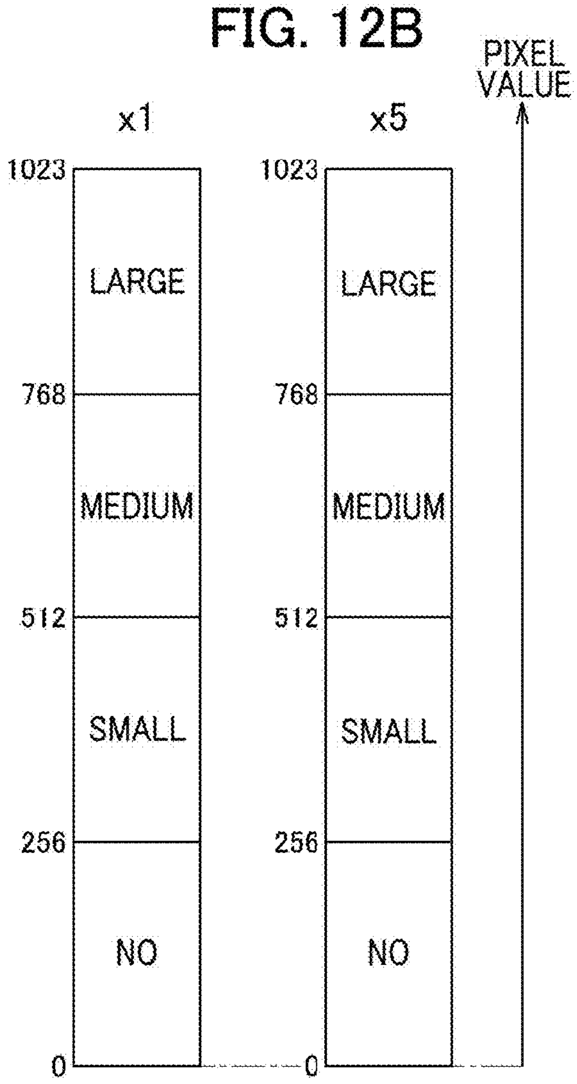
FIG. 12B is graphs showing the relationships between threshold values for determining the sizes of ink droplets and the sizes of ink droplets for each of positions x1 and x5 in the example illustrated in FIG. 12A.

FIG. 11A shows a specific example of the relationship between the medium/large threshold of the relaxation thresholds A and the pixel position in the main scanning direction. FIG. 12A shows a specific example of the relationship between the medium/large threshold of the relaxation thresholds B and the pixel position in the main scanning direction. Both relaxation thresholds A and B specify larger threshold values in the suppression area than those in FIG. 10A for positions x2, x3, and x4. The medium/large threshold of the relaxation thresholds A decreases linearly in the suppression area as the pixel position moves farther away from the normal area, while the medium/large threshold value of the relaxation thresholds B is constant in the suppression area and equivalent to the threshold value in the normal area. In other words, the relaxation thresholds B do not suppress the use of medium and small ink droplets in the suppression area. The process to eject ink droplets of sizes set using the relaxation thresholds B from the head 5 into the suppression area corresponds to the "suppression relaxation process" of the present disclosure. The small/medium threshold and no/small threshold of the relaxation thresholds A are also set larger than the corresponding thresholds in FIGS. 8B and 8C for positions x2, x3, and x4 in the suppression area. Furthermore, for the small/medium threshold and no/small threshold of the relaxation thresholds B, the threshold value in the suppression area is set to a constant value equivalent to the threshold value in the normal area. FIG. 11B is graphs showing the relationships between the relaxation thresholds A and the sizes of ink droplets at positions x1 and x5. FIG. 12B is graphs showing the relationships between the relaxation thresholds B and the sizes of ink droplets at positions x1 and x5.

The prescribed condition described above is determined on the basis of the history information recorded in the ROM 92. As a specific example, the control unit 9 divides the total number of printed sheets printed through borderless printing, as indicated in the history information, by the total usage time (in years) of the printer 100, as indicated in the history information. In this way, the control unit 9 calculates the number of sheets P used per unit time (sheets/year) for borderless printing. If the calculated number of sheets P used per unit time is relatively large, it can be inferred that the interior of the housing 100*a* is rapidly becoming contaminated from mist since borderless printing processes are performed at a high frequency. If the calculated number of sheets P used per unit time is relatively small, on the other hand, it can be inferred that mist contamination in the housing 100*a* is progressing slowly since borderless printing processes have been performed infrequently. Therefore, the control unit 9 determines that the prescribed condition is met when the number of sheets P used per unit time, as calculated above, does not exceed a reference value (sheets/year). However, the control unit 9 determines that the prescribed condition is not met when the number of sheets P used per unit time is greater than or equal to the reference value. This reference value is obtained by dividing an upper limit of the number of sheets P that can be used for borderless printing before the harmful effects of mist reach a critical limit by the service life of the printer 100. However, this reference value may be set according to another method.

The relaxation thresholds A and B may be differentiated in use according to a comparison between the number of sheets P used per unit time and a plurality of reference values. Specifically, a first reference value is set to a value obtained by dividing the upper limit of sheets by the service life of the printer 100, as described above, and a second reference value is set to half the first reference value. The relaxation thresholds A are used when the number of sheets P used per unit time exceeds the second reference value but not the first reference value, and the relaxation thresholds B are used when the number of sheets P used per unit time does not exceed the second reference value.

When the control unit 9 determines in the prescanning process that the detection results from the carriage encoder 11 are inaccurate, the control unit 9 uses the threshold values in FIGS. 8A through 8C, regardless of the number of sheets P used per unit time, because inaccurate detection results of the carriage encoder 11 indicate serious contamination of the carriage encoder 11 or scale 12 due to the harmful effects of mist. The ability of the carriage encoder 11 to accurately detect the position of the carriage 4 has a significant impact on continued use of the printer 100. Therefore, if the detection results from the carriage encoder 11 are inaccurate, as described above, the generation of mist can be reliably suppressed by using the threshold values in FIGS. 8A through 8C to properly suppress the use of medium and small ink droplets.

Figure 13:
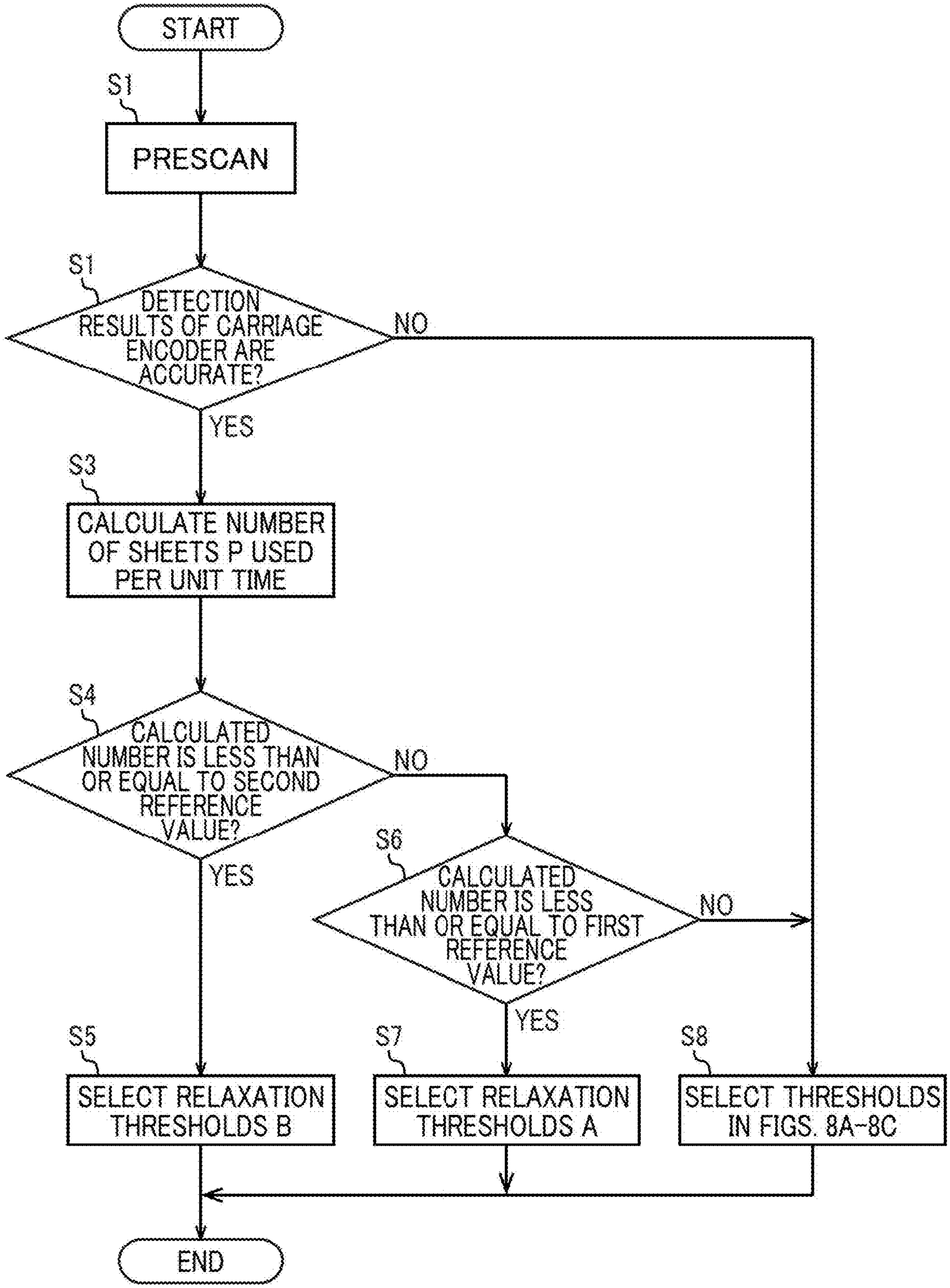
FIG. 13 is a flowchart illustrating steps in a process executed by a control unit of the printer illustrated in FIG. 1 to select threshold values.

A process executed by the control unit 9 to select threshold values based on the number of sheets P used per unit time during borderless printing will be described with reference to FIG. 13. In S1 at the beginning of FIG. 13, the control unit 9 performs a prescan. In S2 the control unit 9 determines whether the detection results of the carriage encoder 11 are accurate. When the control unit 9 determines that the detection results from the carriage encoder 11 are not accurate (S2: NO), in S8 the control unit 9 selects the threshold values in FIGS. 8A through 8C. Subsequently, the control unit 9 ends the process of FIG. 13.

However, when the control unit 9 determines that the detection results from the carriage encoder 11 are accurate (S2: YES), in S3 the control unit 9 calculates the number of sheets P used per unit time during borderless printing by dividing the total number of sheets printed in borderless printing, as indicated in the history information, by the total usage time of the printer 100, as indicated in the history information.

In S4 the control unit 9 determines whether the number of sheets P used per unit time calculated in S3 is less than or equal to the second reference value. When the control unit 9 determines that the number of sheets P used per unit time is less than or equal to the second reference value (S4: YES), in S5 the control unit 9 selects the relaxation thresholds B in FIGS. 12A and 12B. Subsequently, the control unit 9 ends the process of FIG. 13.

However, when the control unit 9 determines in S4 that the number of sheets P used per unit time is greater than the second reference value (S4: NO), in S6 the control unit 9 determines whether the number of sheets P used per unit time is less than or equal to the first reference value. When the control unit 9 determines that the number of sheets P used per unit time is less than or equal to the first reference value (S6: YES), in S7 the control unit 9 selects the relaxation thresholds A in FIGS. 11A and 11B. Subsequently, the control unit 9 ends the process of FIG. 13.

On the other hand, when the control unit 9 determines in S6 that the number of sheets P used per unit time, as calculated in S3, is greater than the first reference value (S6: NO), in S8 the control unit 9 selects the threshold values in FIGS. 8A through 8C. Subsequently, the control unit 9 ends the process of FIG. 13.

According to the embodiment described above, when the prescribed condition is not satisfied, the control unit 9 performs a process to eject ink droplets of sizes determined using the threshold values in FIGS. 8A through 8C from the head 5 into the suppression area of the sheet P. This process is a process to reliably suppress use of medium and small ink droplets.

On the other hand, when the prescribed condition is satisfied, the control unit 9 performs a suppression relaxing process. The suppression relaxing process involves at least one of a process to reduce the degree of suppression on the use of medium and small ink droplets compared to the case in which the threshold values in FIGS. 8A through 8C are used, and a process to halt suppression on the use of medium and small ink droplets altogether. Thus, when the suppression relaxing process is performed, either the quality of images formed on sheets P is not degraded or the degree of quality degradation is less than when the degree of suppression on the use of medium and small ink droplets is not reduced.

The prescribed condition described above is that the number of sheets P used per unit time does not exceed a reference value. The number of sheets P used per unit time is obtained by dividing the total number of printed sheets P specified in the history information by the total usage time of the printer 100 specified in the history information. This value is an indicator of the degree to which contamination by the generation of mist has progressed inside the housing 100*a*. When contamination in the printer 100 has progressed significantly, the use of medium and small ink droplets in the suppression area must be reliably suppressed, which will degrade the quality of images formed on sheets P. However, if contamination in the printer 100 has not progressed significantly, it is appropriate to perform the suppression relaxing process in order to maintain image quality. Hence, by switching between the process of reliably suppressing the use of medium and small ink droplets and the suppression relaxing process on the basis of the number of sheets P used per unit time, the control unit 9 ensures that the use of medium and small ink droplets is suppressed while not unnecessarily degrading image quality.

According to the present embodiment, the prescribed condition is that the number of sheets P used per unit time does not exceed a reference value. The number of sheets P used per unit time is calculated using both the total number of used sheets P and the total usage time of the printer 100.

However, the prescribed condition may be that either the total number of used sheets or the total usage time does not exceed a reference value because each of the total number of used sheets and the total usage time can be used independently as an indicator of the degree to which contamination by mist has accumulated.

However, when the prescribed condition is that either the total number of printed sheets or the total usage time does not exceed a reference value, the prescribed condition will be satisfied as long as contamination in the housing 100*a* due to mist has not reached a significant amount. As a result, processing using the thresholds in FIGS. 8A through 8C will not be performed until contamination by mist in the housing 100*a* has become severe. Therefore, since the suppression relaxing process is initially performed even when the usage background of the printer 100 indicates that contamination of the housing 100*a* by mist progresses rapidly, for example, the housing 100*a* may become contaminated in a short amount of time, which in turn could unexpectedly shorten the service life of the printer 100. Therefore, by using the number of sheets P used per unit time as a reference, as in the present embodiment, the control unit 9 executes a process using the threshold values in FIGS. 8A through 8C to reliably suppress the use of medium and small ink droplets when there is risk that contamination may advance in a short amount of time. This method can prevent an unexpected reduction in the service life of the printer 100.

In the present embodiment, the total number of used sheets P pertains to the number of sheets used in borderless printing processes. As described above, borderless printing is the primary cause of mist generation. Accordingly, by using the number of sheets used in borderless printing processes as a reference, the control unit 9 can properly switch between the process for reliably suppressing the use of medium and small ink droplets and the suppression relaxing process.

Through the suppression relaxing process of the present embodiment, ink droplets of sizes determined using the relaxation thresholds A or B are ejected from the head 5 into the entire suppression area. Therefore, the image quality in the entire suppression area can be improved over the image quality produced when ejecting ink droplets based on the threshold values in FIGS. 8A through 8C.

Note that the suppression relaxing process may be configured so that the control unit 9 controls the head 5 to eject ink droplets of sizes determined using the relaxation thresholds A or B in only a portion of the suppression area rather than the entire suppression area. For example, the head 5 may eject the same ink droplets as those ejected in the normal area in a portion of the suppression area and may eject ink droplets based on the relaxation thresholds A or B in the remaining portion of the suppression area.

In the embodiment described above, relaxation thresholds B are used when the number of sheets P used per unit time do not exceed the second reference value. Furthermore, relaxation thresholds A are used when the number of sheets P used per unit time exceed the second reference value but do not exceed the first reference value. The relaxation thresholds B suppress the use of medium and small ink droplets to lesser degree than the relaxation thresholds A. In other words, the degree to which the use of medium and small ink droplets is suppressed is determined on the basis of the number of sheets P used per unit time. In this way, the control unit 9 can properly adjust the extent to which the use of medium and small ink droplets is suppressed in accordance with the progress of contamination due to mist generation.

<Other Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, in the suppression relaxing process of the embodiment described above, the control unit 9 switches between using the relaxation thresholds A and using the relaxation thresholds B, i.e., not suppressing the use of medium and small ink droplets, according to the number of sheets P used per unit time. As an alternative, the control unit 9 may switch between using the relaxation thresholds A and using relaxation thresholds C according to the number of sheets P used per unit time. As with the relaxation thresholds A, the relaxation thresholds C are set to threshold values designed to suppress the use of medium and small ink droplets in the suppression area, but the degree of suppression is less than that of the relaxation thresholds A.

In the embodiment described above, the control unit 9 obtains the total usage time of the printer 100 based on the starting date and time at which the printer 100 was first used. As an alternative, the control unit 9 may obtain the total usage time of the printer 100 based on a manufacturing start date and time. In this case, the manufacturing start date and time would be recorded in the ROM 92 during the manufacturing process of the printer 100. As another variation, the total length of time that the power to the printer 100 has been on may be used as the total usage time of the printer 100.

In the embodiment described above, the total number of used sheets P is a cumulative value of the number of sheets P used in borderless printing processes. As an alternative, the total number of used sheets may be the cumulative number of sheets P used in all image forming processes, without distinguishing between bordered printing and borderless printing.

The above embodiment assumes that the medium and small ink droplets correspond to the "small droplet" of the present disclosure and that the large ink droplets correspond to the "large droplet" of the present disclosure. As an alternative, the present disclosure may be applied to a method in which the small ink droplets correspond to the "small droplet" of the present disclosure and the medium and large ink droplets correspond to the "large droplet" of the present disclosure. In this case, the use of small ink droplets will be suppressed in the suppression area. Additionally, ink droplets may include two sizes or four or more sizes. In this case, the plurality of sizes of ink droplets should be divided into two groups, small and large, and the present disclosure may be applied to a method in which the former corresponds to the "small droplet" of the present disclosure and the latter corresponds to the "large droplet" of the present disclosure.

In the embodiment described above, the control unit 9 identifies mist contamination of the carriage encoder 11 and the like in a prescanning process and uses the threshold values in FIGS. 8A through 8C when contamination is severe (when the detection results from the carriage encoder 11 are inaccurate). Instead, or in addition to this process, a detection unit (corresponding to the "first detector" of the present disclosure) may be provided in the printer 100 for identifying mist contamination of other parts in the housing 100*a*, and the control unit 9 may use the threshold values in FIGS. 8A through 8C depending on the detection results of this detection unit. This process may be necessary because if mist is repeatedly generated through repeated borderless printing processes, the mist can become deposited in various areas of the housing 100*a*, causing contamination from mist to accumulate.

Note that the present disclosure includes the phrases "at least one of A and B", "at least one of A, B and C", and the like as alternative expressions that mean one or more of A and B, one or more of A, B and C, and the like, respectively. More specifically, the phrase "at least one of A and B" means (A), (B) or (A and B), and the phrase "at least one of A, B and C" means (A), (B), (C), (A and B), (A and C), (B and C) or (A, B and C).

What is claimed is:

1. An image forming device comprising:

a head; and a controller configured to perform:

an image forming process including forming an image represented by image data on a medium by controlling the head to perform a plurality of ejections of liquid droplets onto a plurality of positions within an ejection region of the medium, each of the plurality of ejections including ejecting a corresponding liquid droplet onto a corresponding position of the plurality of positions, the ejection region including an inside area and an outside area of the medium, wherein the forming in the image forming process includes:

a droplet determination process including determining, for each of the plurality of ejections, which to eject a small droplet or a large droplet as the corresponding liquid droplet based on the image data, the small droplet being a liquid droplet having a small size, the large droplet being a liquid droplet having a large size larger than the small size; and an ejection process including ejecting, as each of the plurality of ejections, one of the small droplet and the large droplet corresponding to the corresponding liquid droplet determined in the droplet determination process onto the corresponding position, wherein, in the droplet determination process, the determining for each of the plurality of ejections performs:

when the corresponding position is in a normal area including the inside area and excluding an edge portion in the inside area of the medium:

a normal droplet determination process including determining the corresponding liquid droplet according to a normal criterion; and when the corresponding position is in a suppression area including the outside area and the edge portion of the inside area:

in response to determining that a prescribed condition is not met for both a used medium number and a usage period, a suppression droplet determination process including determining the corresponding liquid droplet according to a first suppression criterion, the used medium number being a cumulative number of media used during the image forming process performed previously, the usage period being a time period for which the image forming device has been used, the first suppression criterion suppressing use of the small droplet more than the normal criterion; and in response to determining that the prescribed condition is met for at least one of the used medium number and the usage period, a suppression relaxation droplet determination process including determining the corresponding liquid droplet according to either a second suppression criterion or the normal criterion, the second suppression criterion suppressing use of the small droplet more than the normal criterion, the first suppression criterion suppressing use of the small droplet more than the second suppression criterion, wherein, in the ejection process, the ejecting performs, in accordance with the determining in the droplet determination process, one of:

a normal ejection process including ejecting the corresponding liquid droplet determined in the normal droplet determination process;

a suppression ejection process including ejecting the corresponding liquid droplet determined in the suppression droplet determination process; and a suppression relaxing process including ejecting the corresponding liquid droplet determined in the suppression relaxation droplet determination process, and wherein suppression degree for the suppression relaxing process is reduced compared to suppression degree for the suppression ejection process, the suppression degree for the suppression relaxing process being degree of suppression on use of the small droplet in the ejecting in the suppression relaxing process compared to use of the small droplet in the ejecting in the normal ejection process, the suppression degree for the suppression ejection process being degree of suppression on use of the small droplet in the ejecting in the suppression ejection process compared to use of the small droplet in the ejecting in the normal ejection process.

2. The image forming device according to claim 1, wherein the prescribed condition is that at least one of the used medium number and the usage period does not exceed a reference value.

3. The image forming device according to claim 1, wherein the prescribed condition is that a unit used medium number does not exceed a reference value, the unit used medium number being calculated using both the used medium number and the usage period.

4. The image forming device according to claim 1, wherein the controller is configured to perform one of a first image forming process and a second image forming process, the first image forming process being the image forming process in which the ejection region is a first ejection region including both the inside area and the outside area, the second image forming process including forming the image represented by the image data by controlling the head to perform a plurality of ejections of liquid droplets onto a plurality of positions within a second ejection region of the medium, the second ejection region including only the inside area of the medium, and wherein the used medium number is a cumulative number of media used during the first image forming process performed previously.

5. The image forming device according to claim 1, wherein, in the suppression relaxation droplet determination process, the determining determines:

when the corresponding position is in a specific portion of the suppression area, the corresponding liquid droplet according to either the second suppression criterion or the normal criterion; and when the corresponding position is in a remaining portion of the suppression area excluding the specific portion, the corresponding liquid droplet according to the first suppression criterion.

6. The image forming device according to claim 1, wherein, in the suppression relaxation droplet determination process, the determining determines, when the corresponding position is in the suppression area, the corresponding liquid droplet according to either the second suppression criterion or the normal criterion.

7. The image forming device according to claim 1, wherein, in the suppression relaxation droplet determination process, the determining determines the corresponding liquid droplet so as to reduce the suppression degree for the suppression relaxing process in accordance with a unit used medium number, the unit used medium number being a number of used media per unit time calculated using both the used medium number and the usage period.

8. The image forming device according to claim 1, further comprising:

a component; and a first detector configured to detect contamination of the component, the contamination being caused by deposition of liquid droplets on the component as the image forming process is repeatedly performed, wherein, in the droplet determination process, the determining for each of the plurality of ejections performs, when the first detector detects the contamination and the corresponding position is in the suppression area, the suppression droplet determination process irrespective of whether the prescribed condition is met.

9. The image forming device according to claim 8, further comprising:

a moving mechanism configured to move the head; and a second detector configured to optically detect a position of the head, wherein the component is the second detector.

* * * * *